INVENTOR.
MATTEO D'APOLITO
BY Stanley Sacks
ATTORNEY

Oct. 6, 1964   M. D'APOLITO   3,151,813
MOLDED ARTICLE SEPARATOR
Filed Oct. 24, 1960   2 Sheets-Sheet 2
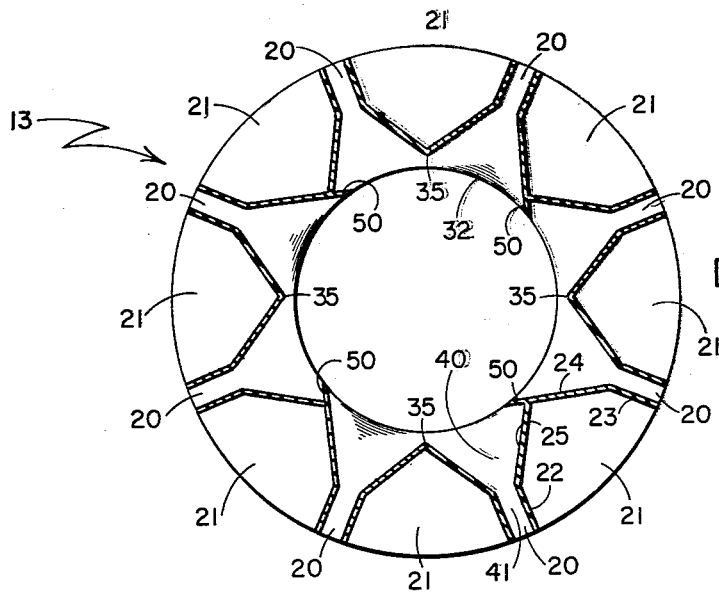
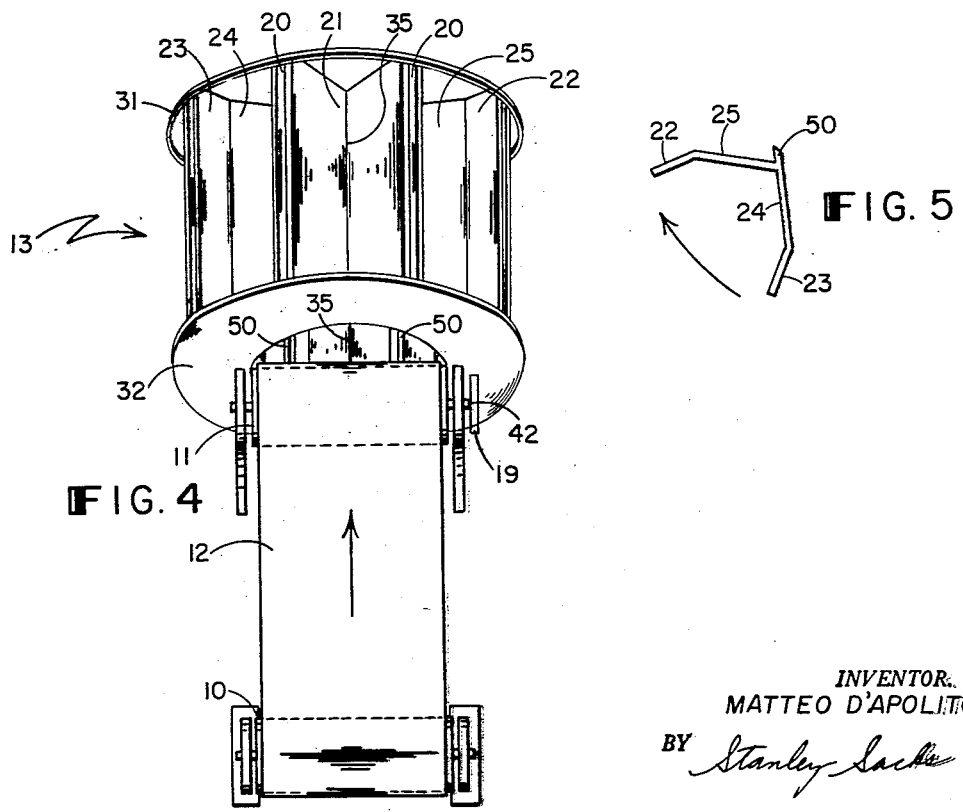
INVENTOR.
MATTEO D'APOLITO
BY Stanley Sacks
ATTORNEY.

United States Patent Office 3,151,813
Patented Oct. 6, 1964

3,151,813
MOLDED ARTICLE SEPARATOR
Matteo D'Apolito, Leominster, Mass., assignor to Foster Grant Co., Inc., Leominster, Mass., a corporation of Delaware
Filed Oct. 24, 1960, Ser. No. 64,596
8 Claims. (Cl. 241—68)

This invention relates generally to the art of separating and/or sorting molded articles from scrap material formed therewith. More specifically, this invention relates to a specific molded article separator and/or sorter which will automatically separate and/or sort molded articles from the runners and sprues attached to these articles in a molding process.

It is well known in the art that most molded articles emerging from single and multi-cavity molding machines are attached to at least one runner comprising at least one sprue employed in manufacturing of said articles. Many methods have been employed in separating and/or sorting such articles from this scrap material attached thereto.

As employed in this specification, a separator is a machine for physically breaking or cutting a molded article from material attached thereto. The term sorter is herein used to indicate a machine which sorts or grades molded articles from each other or from other materials which are not attached to said articles. My invention is particularly efficient when employed with molded articles which are substantially flat or planar and which have associated therewith at least one runner and at least one sprue which have a substantially three-dimensional arrangement. The runners are normally rod like forms arranged in substantially one plane. The sprue or sprues normally are rod like forms which are integrally attached to the runners and are substantially perpendicularly arranged with the plane of said runners. However, my invention can be employed in any situation where the article to be separated and/or sorted comprises different dimensions than the material from which it is to be separated and/or sorted.

The apparatus of this invention may be employed in the manufacture of such molded articles as combs, sunglasses, boxes, novelties, etc.

One known method of sorting molded articles from runners and sprues is based on an endless conveyor belt means. Two substantially flat endless belts are substantially horizontally aligned in end to end relationship. An opening is formed between the belts by placing the first belt a desired distance from the second belt. In operation, each conveyor belt is actuated so that molded articles and runners with attached sprues which have been previously separated therefrom will be moved on the first belt towards the second belt. The molded articles fall into the opening between the belts when they reach the end of the first belt. The runners and sprues being of a size and shape which do not allow them to fall through the opening, will slide over the opening and be carried by the second belt to a suitable runner collection receptacle. This method and apparatus is limited in its efficiency of sorting since the molded articles and runners with attached sprues may easily become tangled with each other, either during their placement on the first belt or at the opening between the two belts. To my knowledge, no efficient means of preventing or correcting this tangling problem has been employed by the prior art. It should be noted that a machine of this type cannot be employed to carry out separation of molded articles and runners from each other but rather is used merely to sort them.

It is known that molded articles and runners with attached sprues can be separated and sorted from each other by apparatus attached directly to a molding machine as an integral part thereof. In such machines the runners with attached sprues are separated or cut from the molded article when the mold block opens. Mechanical fingers are employed to catch the runners and mechanical sweepers catch the molded articles.

Air currents may be employed to blow the runners into one receptacle and the molded articles into a second receptacle. This type of apparatus has several disadvantages. The apparatus is relatively expensive, difficult to adjust, and subject to malfunction. If the timing of the fingers or sweepers is not precisely adjusted malfunction of the molding machine and resulting shutdown of molding operations occurs.

To my knowledge prior art automatic separating and/or sorting machines for molded articles have been unable to attain efficiencies higher than approximately 90%. Ten percent loss of the molded articles due to their collection with the scrap or runner material is an extremely undesirable loss for most molded article manufacturers.

Because of the aforementioned difficulties encountered with prior art automatic separating and/or sorting machines for molded articles and runners with attached sprues, many manufacturers still perform separation and sorting by hand methods. Such a practice although efficient as to accuracy of separating and sorting, is in total inefficient due to high labor costs.

I have now developed a remarkably efficient apparatus and method for separating and/or sorting molded articles from runners and sprues.

One object of my invention is to provide a method for separating molded articles from runners and sprues in a rapid, efficient and economical procedure.

Another object of my invention is to provide a machine for separating and sorting molded articles from attached materials.

A further object of my invention is to provide a machine for sorting previously separated molded articles from runners and sprues.

My invention comprises a rotatable substantially cylindrical, hollow member or cylinder formed essentially of chute members. The term "substantially cylindrical" as used herein includes polygonal shapes of all types. The cylinder is preferably mounted at a small angle to the horizontal. Horizontal mounting of the cylinder may be employed; however, in such case, complicated material movement means such as air jets must be employed. Any rotatable mounting means may be employed. The chute members of the cylinder are formed with openings so as to allow passage therethrough of substantially planar articles while restricting passage of substantially nonplanar articles. In use the size of each opening is adjusted so as to allow one or more sizes and shapes of articles to pass therethrough while restricting passage therethrough of other sizes and shapes of articles. Therefore, the size and shape of the chute opening will vary depending on the particular items to be separated. I have found that the use of a rotatable cylinder of my invention will effectively separate and/or sort different sized objects as will be described more fully below.

It is obvious that various feed means for bringing the articles to be separated and/or sorted to the cylinder may be employed. The feed means may be attached to the cylinder in such a manner that the drive mechanism for the feed means can be linked to the cylinder to cause rotation thereof. In some cases the cylinder may be positioned so as to receive articles to be separated directly from a molding machine. The molded articles are ultimately deposited in a receptacle positioned below the cylinder chutes, and the attached material, e.g., runners and sprues are deposited in a receptacle positioned below the downwardly inclined exit end of the cylinder. It is obvious that the size of the chutes may be varied so as to have various sized chutes starting with smaller opening at the feed end of the cylinder and being larger at the exit end. If such an expedient is employed, various sizes of molded articles may be separated and sorted within the cylinder and deposited in receptacles progressively arranged below said cylinder.

Other objects and features will become readily apparent from the following detailed description and illustrations which are not limiting but only illustrative of the preferred embodiments of my invention. In the attached drawings like numerals represent like parts.

FIGURE 3 is a side section along line 3—3.

FIG. 4 is a top view of the molding separator and/or sorter machine and adjoining feed means of FIGURE 1.

FIGURE 5 is a side section of an alternate embodiment of the chute means of my invention.

Figure 1:
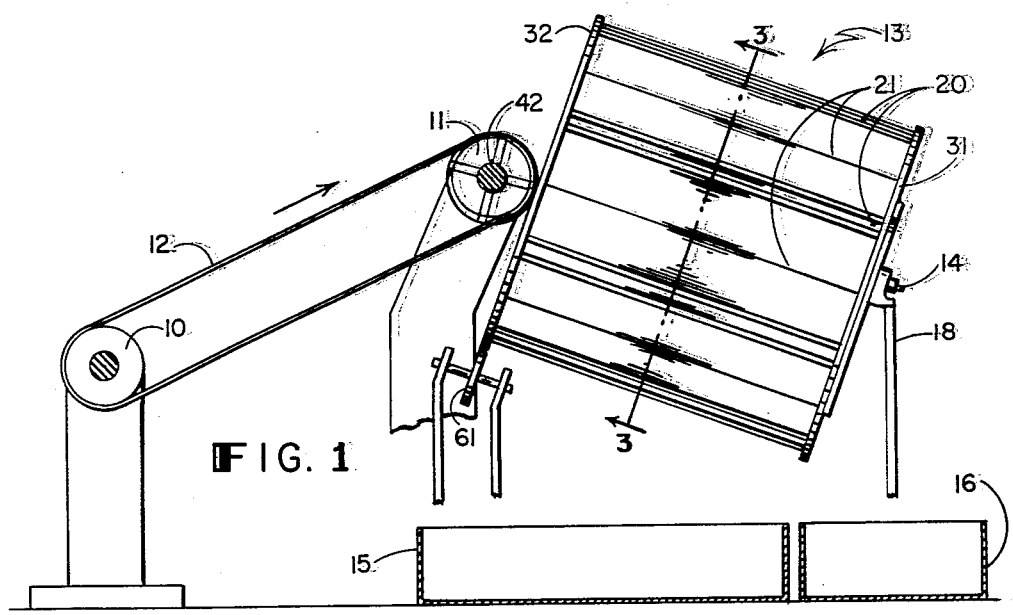
FIGURE 1 is a side view of the molding separator and/or sorter machine and adjoining feed means.

The rotatable cylinder 13 comprises a group of at least four and preferably 8 circularly arranged chute members 21, held together by attached rims 31 and 32. The rims 31 and 32 are affixed by conventional means, i.e., welding, bolting, etc. to the chutes 21. A cross bar or spoke is attached to rim 31 at the exit end, such cross bar being shown in FIGURE 2 at 30. A central axle 14 is mounted on the end cross bar or spoke. As most clearly seen in FIGURES 1 and 2, the axle is supported by conventional legs or supports 17 and 18. The cylinder is rotatable around its central axis. The axle 14 may be rigidly affixed to the end crossbar and be rotatably mounted on legs 17 and 18 or conversely may be rigidly affixed to legs 17 and 18 and rotatably mounted on the end cross bar. I prefer to use the latter means of attachment.

The front or entry end of the cylinder is mounted on rollers 61 and 62 which may be supported by any conventional frame means not shown. If desired a cover housing (not shown) may be employed with the rotatable cylinder and said rollers may be mounted on the lower portion thereof. The cylinder may be mounted on power driven rollers at each end or a central axle mounted on crossbars or spokes at either end may be employed.

Figure 2:
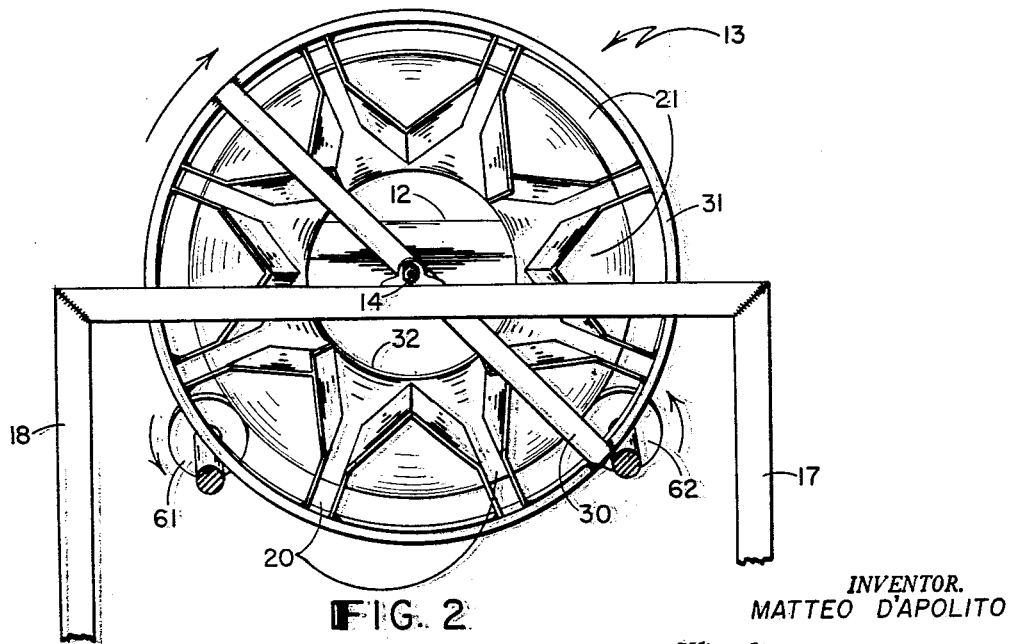
FIGURE 2 is a rear perspective view of the rotatable cylinder along the axis thereof.

The chute members 21 are axially arranged around the periphery of the cylinder 13 as most clearly seen in FIGURES 2 and 3. Each chute member is preferably constructed of a light weight sheet metal, although other materials may be employed, and comprises substantially parallel walls 22 and 23 joined by walls 24 and 25 which extend from the inner ends of 23 and 22 respectively at obtuse angles and which meet at peak 35. As can be seen in FIGURES 2 and 3, the walls 22, 23, 24, and 25 of the chute members form openings or chutes 20 which are divided into wide slanting top portions 40 and narrow bottom portions 41. The length of walls 22 and 23 will vary greatly depending on the particular materials to be separated and/or sorted. Any convenient means of obtaining these openings may be employed on the cylinder. It is only necessary that the chutes have inner enlarged openings aligned with smaller outer openings so dimensioned as to operate as will be described below.

As most clearly seen in FIGURES 1 and 2 rim 31 is preferably a ring of flat band like strip positioned on the outer extremities of cylindrical member 13. Rim 32 at the entry end of the cylinder is preferably a thin hollow disk which extends inwardly from the circumference of the cylinder and covers the entry end of the chute members 21.

As clearly shown in FIGURE 5, baffle or lip projections 50 can be associated with each of the peaked walls 24 or 25. These baffles are preferably continuous, planar, integral extensions of walls 24 or 25 although they may be separate projections attached to peaked walls 24 or 25. The function of these baffles will be fully disclosed in the discussion of the operation of my apparatus. Baffles 50 may be employed as shown in FIGURES 2 and 3. Alternatively baffles 50 may be entirely omitted if desired.

My molding separator and/or sorting machine may be utilized directly at the molding machine with the molded articles, runners and sprues dropping directly into it or it may be utilized separately and be manually or automatically fed the articles to be separated.

A preferred feed mechanism with attached cylinder drive means is shown in FIGURES 1 and 4. An endless belt 12 is positioned to receive the articles to be separated at one end and to feed the molding separator and/or sorter machine at its other end. Rolls 10 and 11 are drive rolls for endless belt 12. Drive wheel 19 is affixed to roll 11 by axle 42 and will rotate with roll 11 when roll 11 is actuated by conventional drive means not shown. Drive wheel 19 is frictionally positioned against rim 32. Thus it will cause cylinder 13 to revolve about axle 14 when drive wheel 19 is actuated by roller 11. If desired, drive wheel 19 and rim 32 may be geared so as to provide positive mechanical drive. It is apparent that the cylinder 13 may be rotated by any suitable conventional drive means.

I have found that the dimensions and details of my invention may vary greatly depending on the particular items to be separated.

The operation of the machine is simple and efficient. Rolls 10 and 11 are actuated, causing belt 12 to move in the direction indicated, causing drive wheel 19 to revolve, which in turn causes cylinder 13 to rotate in a clockwise direction.

The direction of rotation of cylinder 13 is optional unless baffle means such as shown at 50 are employed. In the latter case the cylinder is rotated in the direction indicated in FIGURE 5. The baffles or projections when used act as hook means and aid in carrying the molded articles and runners with attached sprues in a substantially arcuate path to the upper portion of the cylinder.

Articles to be separated such as molded articles and runners with attached sprues attached thereto are positioned on the belt 12. It should be noted that belt 12 may be positioned so as to receive these articles directly from a molding machine in which case conventional driving means such as a motor and pulley system may be employed to rotate cylinder 13. The molded articles and attached material are deposited in the cylinder 13 at a point near the rim 32. As can be seen in FIGURE 1, the cylinder is preferably mounted at an angle to the horizontal. This angle is preferably a 2–5 degree angle between the horizontal and the axis of the cylinder. The chute openings 40 and 41 are so dimensioned that the molded articles and runners with attached sprues will enter the top substantially V-shaped portion thereof, but only the molded articles will be capable of entering and passing through the bottom portion 41. The molded articles and attached materials are held by the top substantially V-shaped portion of the chutes and are carried upwardly as the cylinder rotates. As they rise to a point where the centrifugal and frictional forces on sides 24 and 25 can no longer support them, they are then pulled down by gravity and fall to the bottom of the rotating device. Thus, the tumbling or rising and falling of the molded articles, runners, and sprues will cause the runners and sprues to break away from the molded articles. The size of the cylinder, i.e., length and diameter will largely be determined by the number and degree of tumbling actions required in order to cause the aforementioned breakage. Upon falling and breaking of the parts, the disengaged molded articles will fall through openings 20 into a suitably positioned container 15. The detached runners and sprues and the molded articles with as yet undetached runners and sprues will continue downwardly axially along the cylinder with constant tumbling action with a higher and higher percentage of articles being separated and sorted until finally substantially all of the molded articles will slide through openings 20 and the runners and sprues will slide out of the cylinder into receptacle 16. The tumbling action of the machine eliminates any tangling of the molded articles with the runners and sprues.

It is obvious that my machine may be used to sort previously separated runners and sprues from molded items, as well as to separate and to sort such articles. Thus, previously separated runners with attached sprues and molded articles may be deposited in cylinder 13 and will be sorted into receptacles 15 and 16 when the machine is operated as previously described.

The use of my machine in the manner set forth above is highly efficient. For example, I have employed my device to separate sunglass frontal members from attached runners having one sprue. A molded shot from a 4 cavity die having 4 frontal members with sprue and runners is introduced into my machine. The gates between the frontal members and the runners are formed by the use of pinpoint gating. I employ an inside cylinder diameter of 22 to 28 inches and a length of at least 10 inches with 20 to 30 inches being a practical range. The cylinder may be rotated at speeds of 1 r.p.m. and up with speeds of 2.5 to 4 r.p.m. being preferred.

In this procedure an efficiency of 99.75% is achieved, i.e., only an average of 2.5 frontal member per 1000 failed to be separated and sorted from the scrap material (runner and sprues) originally attached thereto.

Many changes and alterations may be made without departing from the spirit and scope of my invention which is set forth in the appended claims which are to be construed as broadly as possible in view of the prior art.

I claim:

1. An apparatus for separating and sorting molded articles from scrap material formed therewith, said apparatus comprising a rotatable substantially cylindrical member, said cylindrical member comprising chute members axially aligned with said cylindrical member arranged around the periphery of the cylinder and forming openings in the cylinder between said chute members, said openings having an enlarged portion nearest to the axis of said substantially cylindrical member and selected ones of said chute members comprising baffle means for aiding and carrying molded articles and scrap material to the upper portion of the substantially cylindrical member.

2. The apparatus claim 1 wherein said chute members are so formed as to provide therebetween substantially V-shaped inner chutes integral with narrow substantially parallel sided outer chutes.

3. The apparatus of claim 1 wherein each chute member comprises first and second substantially planar parallel walls spaced apart by third and fourth substantially planar walls extending between said first and second walls at obtuse angles thereto and joining with each other at a peak substantially on a mid plane parallel to said first and second walls.

4. An apparatus for separating and sorting molded articles from scrap material formed therewith, said apparatus comprising a rotatable substantially cylindrical member mounted at an inclination to the horizontal, said cylindrical member comprising chute members axially aligned with said cylindrical member arranged around the periphery of the cylinder and forming openings in the cylinder between said chute members, said openings having an enlarged portion nearest to the axis of said substantially cylindrical member.

5. The apparatus of claim 4 wherein baffle means for aiding and carrying molded articles and scrap material to the upper portion of the cylindrical member are positioned on said chute members.

6. The apparatus of claim 4 wherein said chute members are so formed as to provide therebetween substantially V-shaped inner chutes integral with narrow, substantially parallel sided outer chutes.

7. The apparatus of claim 4 wherein said chute member comprises first and second substantially planar parallel walls spaced apart by third and fourth substantially planar walls extending between said first and second walls at obtuse angles thereto and joining with each other at a peak substantially on a mid plane parallel to said first and second walls.

8. An apparatus for separating and sorting molded articles from scrap material formed therewith, comprising a horizontal inclined, rotatable substantially cylindrical member, said substantially cylindrical member comprising chute members axially aligned with said cylindrical member formed so as to provide therebetween substantially V-shaped inner chutes integral with narrow substantially parallel sided outer chutes, said substantially cylindrical member having an inside diameter of about 22 to 28 inches and a length of about 20 to 30 inches.

References Cited in the file of this patent

UNITED STATES PATENTS

| 137,409 | Bixby | Apr. 1, 1873 |
| 166,743 | Bolthoff | Aug. 17, 1875 |
| 262,652 | Dodge | Aug. 15, 1882 |
| 271,138 | Sharpneck | Jan. 23, 1883 |
| 743,791 | Abbe | Nov. 10, 1903 |
| 854,443 | Voorhees | May 21, 1907 |
| 1,441,162 | MaCartney | Jan. 2, 1923 |
| 1,458,387 | Bourne | June 12, 1923 |
| 1,877,517 | MaCartney | Sept. 13, 1932 |
| 1,903,166 | Bryant | Mar. 28, 1933 |
| 1,987,509 | Kendoff | Jan. 8, 1935 |
| 2,380,563 | Kopplin | July 31, 1945 |
| 2,402,967 | Lubenow | July 2, 1946 |
| 2,476,540 | Fraser | July 19, 1949 |
| 2,592,054 | Mertz | Apr. 8, 1952 |
| 2,721,035 | Lankford et al. | Oct. 18, 1955 |
| 2,726,815 | Heckett | Dec. 13, 1955 |

FOREIGN PATENTS

| 3,061 | Great Britain | of 1889 |